Figure 1:
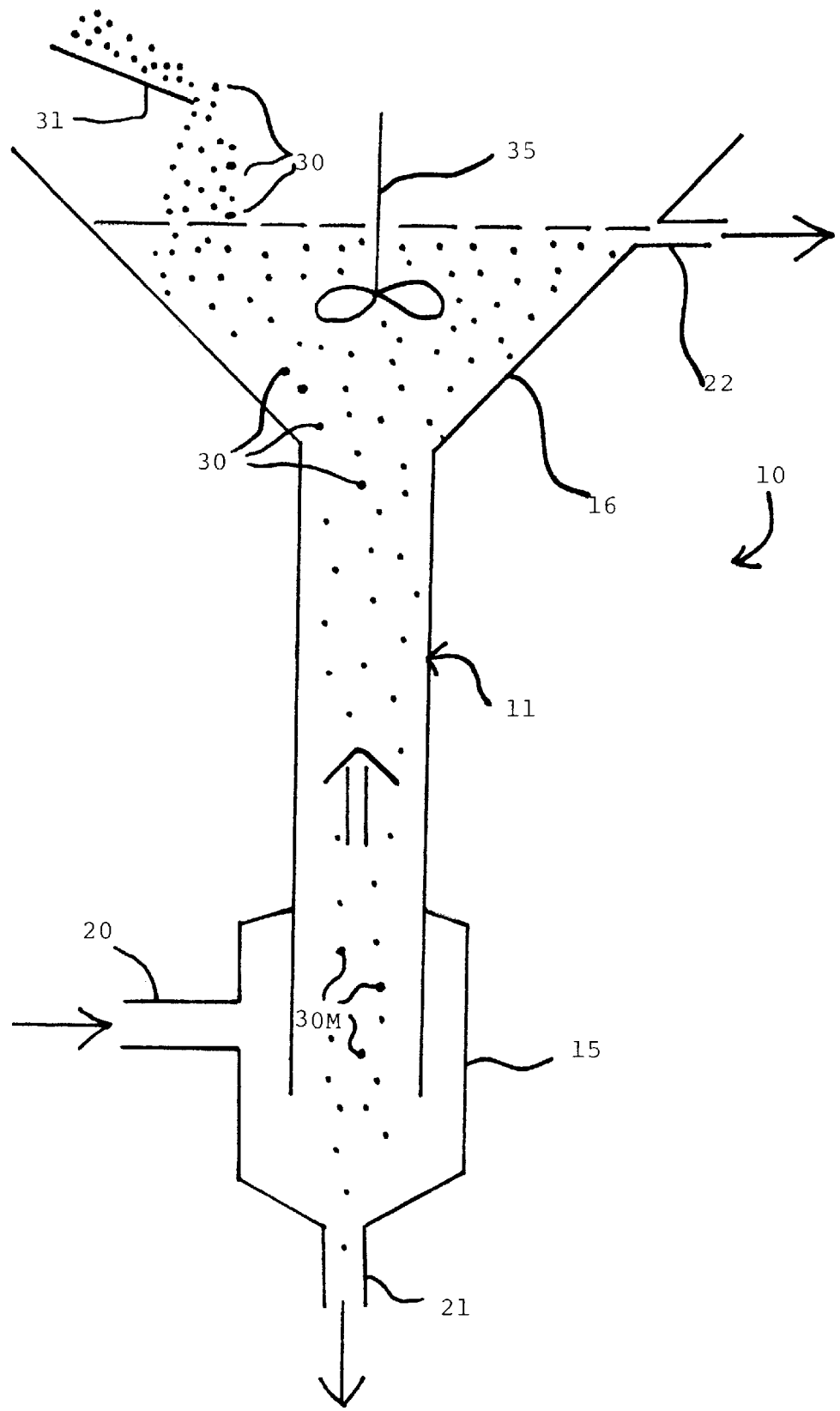

United States Patent [19]

Currie

[11] Patent Number: 5,902,376
[45] Date of Patent: May 11, 1999

[54] RECOVERY OF MERCURY FROM CAUSTIC SLUDGES USING A HYDRAULIC MINERAL SEPARATOR

[75] Inventor: John D. Currie, Pictou, Canada

[73] Assignee: ICI Canada Inc., Ontario, Canada

[21] Appl. No.: 08/869,600

[22] Filed: Jun. 5, 1997

Related U.S. Application Data

[63] Continuation of application No. 08/503,920, Jul. 19, 1995, abandoned.

[30] Foreign Application Priority Data

May 31, 1995 [CA] Canada ................................ 2150591

[51] Int. Cl.⁶ .................................................. C22B 43/00
[52] U.S. Cl. ............................ 75/742; 423/109; 210/914; 210/800; 588/231
[58] Field of Search ..................... 75/714, 742; 423/109; 210/800, 914; 588/231

[56] References Cited

U.S. PATENT DOCUMENTS

| 1,483,371 | 2/1924 | Miller et al. . |
| 2,552,378 | 5/1951 | McNeill . |
| 2,837,408 | 6/1958 | Sakowski . |
| 3,536,597 | 10/1970 | Yamori et al. . |
| 3,550,773 | 12/1970 | Villani et al. . |
| 3,642,129 | 2/1972 | McDaniel et al. . |
| 3,785,942 | 1/1974 | Carlson . |
| 4,149,879 | 4/1979 | Loo . |
| 4,381,288 | 4/1983 | Weiss et al. . |
| 4,554,066 | 11/1985 | Turbitt et al. . |
| 4,789,464 | 12/1988 | Kuryluk . |
| 4,913,807 | 4/1990 | Hendricks . |
| 5,244,492 | 9/1993 | Cyr . |

FOREIGN PATENT DOCUMENTS 420 380  4/1991  European Pat. Off. .

*Primary Examiner*—Robert J. Popovics
*Attorney, Agent, or Firm*—Cushman Darby & Cushman Intellectual Property Group of Pillsbury Madison & Sutro LLP

[57] ABSTRACT

A process for the recovery of mercury from mercury-containing caustic sludge, generated from a mercury cell, chlor-alkali plant, wherein mercury is removed from the caustic sludge by treatment in a hydraulic mineral separator. The process provides a ready method for removal of mercury from caustic sludge which can allow recovery of the mercury for re-use. Alternatively, the process provides a smaller volume of mercury-contaminated material to be treated and/or land-filled.

10 Claims, 1 Drawing Sheet

RECOVERY OF MERCURY FROM CAUSTIC SLUDGES USING A HYDRAULIC MINERAL SEPARATOR

This is a continuation of application Ser. No. 08/503,920 filed on Jul. 19, 1995 now abandoned.

FIELD OF THE INVENTION

This invention relates to a process for the treatment of caustic sludge materials, and in particular, to a process for the recovery or removal of mercury from such materials.

DESCRIPTION OF THE RELATED ART

Liquid mercury is used in a variety of industrial processes including its use as an electrode in some chlor-alkali plants for the production of gaseous chlorine and an aqueous solution of an alkali metal salt. The use of such mercury cells for this application is well known in the industry, and is commonly used for the electrochemical generation of chlorine and sodium hydroxide from a sodium chloride solution. The use of other alkali metal salts, such as potassium chloride to produce potassium hydroxide, is also known.

During operation of this type of chlor-alkali plant, finely dispersed mercury droplets are suspended within the generated aqueous solution. These mercury droplets are typically removed from the aqueous solution by filtration through a suitable filtering medium. This medium is most commonly powdered or granular carbon, but can include other organic, polymeric or inorganic filtering medium. After the mercury has been removed from the aqueous solution, a mixture of mercury mixed with the filtering medium is generated. This mixture is termed in the industry as "caustic sludge" since typically, it is generated from an aqueous caustic (sodium hydroxide) solution.

However, in this document, the term "caustic sludge" will be used to refer to any mixture of mercury and a filtering medium wherein this mixture is generated during filtering of an alkali metal salt solution.

Caustic sludge is thus primarily a mixture of carbon and/or some other filtering medium, and mercury. The level of mercury is dependent on the operation of the plant, but may be as high as 70% (or more) mercury, by weight. However, typically, the level of mercury present is between 30% and 55% of the content of the caustic sludge, by weight.

Disposal of this sludge is generally difficult and/or expensive because of its contamination with mercury. Thus, landfilling of the caustic sludge in an appropriate land-fill operation, as one disposal means, can be a significant expense. Further, loss of the mercury adds to the expense of the operation of the chlor-alkali facility.

A second method for caustic sludge treatment is to mix the caustic sludge with a large excess of water while stirring in order to "wash" the mercury droplets from the caustic sludge amalgam. This approach has met with some success, but separation of the mercury from the sludge is not complete, and the method does not consistently provide the levels of mercury removal desired.

Accordingly, it would be desirable to provide an improved method for the removal of mercury from caustic sludge, and preferably, for the recovery of the mercury contained in the sludge.

In the mining industry, it is known that soil particles containing precious metals, such as gold, can be separated from other particles of comminuted ores, by use of a hydraulic mineral separator. This type of device uses a upward flow of a liquid, which is preferably water, through an essentially vertical tube, to separate those particles having a higher density from those particles with a low density. Generally, the liquid stream enters the vertical tube at or near the bottom of the tube and flows upwardly until it exits the tube at or near the top of the tube. Soil particles of an essentially constant size (by volume) are fed into the top of the tube. The rate of liquid flow is controlled so that only the heavier particles will settle and/or sink through the upwardly flowing liquid stream. The lighter particles are unable to sink through the upwardly flowing liquid stream and remain at, or near the top of the vertical tube.

These types of hydraulic mineral separators have been know for a number of years and have been described by, for example Miller in U.S. Pat. No. 1,483,371 (issued Feb. 12, 1924), McDaniel et al. in U.S. Pat. No. 3,642,129 (issued Feb. 15, 1972), Turbitt et al. in U.S. Pat. No. 4,554,066 (issued Nov. 19, 1985), and Kuryluk in U.S. Pat. No. 4,789,464 (issued Dec. 6, 1988). While these types of devices have been known for several years, their primary use has been limited to the classification of ore samples for mining operations as a guide to the amount of heavy metals present in an ore sample. To date, it has been unknown to use an hydraulic mineral separator for the purpose of recovering mercury from mercury-contaminated caustic sludge.

SUMMARY OF THE INVENTION

Accordingly, the present invention provides a caustic sludge treatment process for removal or recovery of mercury from said sludge, which process comprises i) treatment of said sludge in a hydraulic mineral separator to form a higher density, mercury-containing fraction and a lower density, substantially mercury-free fraction, and iii) separation of said higher density fraction from said lower density fraction.

In operation of the hydraulic mineral separator, the mercury droplets and/or the mercury-containing particles will settle/sink through the vertical tube of the separator because of the high specific gravity of mercury. These droplets and/or particles can be collected at the bottom of the tube. Preferably, however, the liquid mercury essentially completely separates from the caustic sludge sample in order to form a relatively heavy, dense mercury droplet. This heavy, dense droplet of mercury will settle through the separator.

The remaining caustic sludge material, from which the mercury has been removed, generally consists of the remaining caustic filtering medium. This filtering material is less dense than the mercury, and thus will not be sufficiently heavy to sink through the liquid flow and thus will collect at the top of the tube. The low density filtering material can thus be removed from the top of the mineral separator system.

Thus, the hydraulic mineral separator will effectively remove the mercury from the caustic sludge. Accordingly, in a preferred embodiment, the process described hereinabove with respect to the present invention provides a method for the removal and recovery of substantially pure mercury from a mercury-contaminated caustic sludge sample.

Depending on the efficiency of the hydraulic mineral separator, the resultant material found in the high density portion may consist essentially of mercury with some trace amount of sludge contamination. This mercury may be collected and reused as liquid mercury after additional purification, if desired.

The high density material may also be collected as a smaller volume caustic sludge sample which contains higher levels of mercury than the initial, larger volume caustic sludge sample. Treatment and/or disposal of the smaller sludge sample is preferable to treatment and/or disposal of the larger volume sludge sample since the cost of disposal of this concentrated sample in, for example, an approved land-filling operation, would be reduced over the cost of land-filling the larger initial volumes of contaminated sludge.

As a further purification stage, the sample of high density particles collected from the mineral separator may be sent through one or more additional mineral separators to further reduce the sample size of the mercury-containing, high density fraction. Further, the sample may be sent through a series of mineral separators (or through the same mineral separator a number of times) until the high density fraction is essentially droplets of mercury. Accordingly, in one preferred embodiment, the sludge sample is passed through one or more mineral separators until the high density particles are mercury droplets containing greater than 95%, and more preferably, greater than 99%, mercury by weight.

Thus, the present invention provides a process as described hereinabove wherein said higher density fraction is treated in a at least one further hydraulic mineral separator to form a second higher density, mercury-containing fraction and a second lower density, substantially mercury-free fraction, followed by separation of said second higher density fraction from said second lower density fraction.

Most preferably, the present invention provides a process as hereinabove described, comprising a caustic sludge treatment process for removal or recovery of mercury from said sludge, which process comprises i) treatment of said sludge in one or a series of hydraulic mineral separators to form a higher density, mercury-containing fraction and a lower density, substantially mercury-free fraction, and iii) separation of said higher density fraction from said lower density fraction, wherein said higher density, mercury-containing fraction comprises greater than 95%, and more preferably, greater than 99% mercury, by weight, and wherein said lower density, substantially mercury-free fraction comprises less than 1% mercury, and more preferably, less than 0.5% mercury by weight.

The hydraulic mineral separator can be any of the hydraulic mineral separators known in the mining industry, which can be used to separate materials having a high specific density from those having a low specific density by using a flowing liquid stream. A preferred mineral separator, however, is one which has been designed to operate in a continuous manner so that the mercury-contaminated caustic sludge can be added continuously to the process, and the mercury and the sludge discharge can be removed on a substantially continuous basis.

A wide variety of liquids may be used in a hydraulic separator. It is desirable to use liquids which do not react with the sludge or the mercury, other than to possibly dissolve the sludge particles. The density of the liquid selected should also be such to facilitate the settling of the high density particles through the liquid. A most preferred liquid for use in the present invention is water.

The liquid flow rate through the separator is set so that the denser particles will settle through the vertical tube, and that the lighter particles will be washed out of the top of the separator. It is apparent that the flow rate may vary depending on the nature of the sample being treated.

The preferred method of operation of the process of the present invention is an embodiment wherein the mercury is collected as an essentially pure mercury stream. This process allows the collection of a mercury stream which can be recycled and/or re-used, and allows for the disposal of the caustic sludge without needing to address the problem of contained mercury.

In the process of the present invention, it is possible that an unacceptably high amount (depending on various discharge standards) of mercury may become dissolved in, or dispersed in (as fine droplets), the liquid used in the mineral separator. When this occurs, some of the mercury originally present is lost as part of the mineral separator overflow and thus it is necessary to treat the liquid (e.g. water) in order to remove the mercury from the water stream.

Accordingly, the present invention also provides a process wherein the liquid being discharged from the mineral separator is treated in a liquid treatment process to remove the mercury contamination, and in the preferred embodiment, to remove mercury from the water used in the mineral separator. Thus, in a preferred water treatment process, the water from the mineral separator which contains the high density particles is directed to a sedimentation tank wherein the high density particles settle from the water, and are removed. This water after settling is essentially free of mercury and can be discharged or recycled to the process system.

The liquid overflow from the mineral separator (which contains the lower density particles) is also directed to a second sedimentation vessel wherein the solid particles settle to the bottom of the vessel and are removed. Chemicals, such as aluminum sulphate or other conventionally known water treatment coagulants, may optionally be added in order to shorten the sedimentation time, and/or to increase sedimentation efficiency. The supernatant from the sedimentation vessel may be recycled, in whole or in part, to the process, or may be further treated in order to be discharged from the system. A preferred further treatment process involves further sedimentation in additional sedimentation vessels. After the suspended particles have settled and been removed, the final supernatant is treated with acid or caustic as necessary to adjust the pH of the liquid to between 7 and 11, and more preferably between 7.5 and 8.5 and, most preferably to a pH of about 8. The pH adjusted liquid is then treated with various chemicals, such as ferrous sulphate or sodium hydrosulphide to remove any remaining mercury as newly created suspended solids or sulphides in a stirred settler. The overflow from the settler can then be filtered through, for example, a sand filter followed by a carbon filter to remove any carbon adsorbent liquids or solids. The carbon filtered water may then be discharged to the environment.

EXAMPLES

The process will now be described, by way of example only, by reference to the following example, and by reference to the attached figures wherein FIG. 1 describes a process diagram for the operation of a hydraulic mineral separator in accordance with the process of the present invention.

In FIG. 1, hydraulic mineral separator 10 comprises an upright central tube 11 which extends from a water inlet chamber 15 to funnel opening 16. Water inlet 20 is attached to water inlet chamber 15, and discharge outlets 21 and 22 are attached to water inlet chamber 15 and funnel opening 16, respectively.

In the practise of the present invention, water is fed to separator 10 through water inlet 20. The water enters water inlet chamber 15 and then flows upward through central tube 11 into funnel opening 16. A portion of the water exits separator 10 through discharge opening 21, and the remaining water exits separator 10 through discharge opening 22. Discharge opening 21 is smaller than water inlet 20 so as to ensure that water is forced to flow upward through tube 11. The flow of water into separator 10 is controlled so that the flow of water upward through tube 11 is essentially constant.

Caustic sludge "particles" (or "droplets") 30 are added from hopper 31 to funnel opening 16. There, they are mixed into the water in funnel 16 by stirrer 35. While in funnel opening 16, sludge particles 30 enter the upper opening of tube 11. Only those particles which contain mercury, or which consist essentially of mercury which has been released from caustic sludge particles 30 have a density/weight which allows these particles to settle through the upwardly flowing water stream in tube 11. These dense sludge particles (or mercury droplets), designated as 30M are able to settle through tube 11 and fall into water inlet chamber 15.

Water inlet chamber 15 has a cross sectional area greater than that of tube 11 so that the water velocity in chamber 15 is less than in tube 11. Accordingly, once particles 30M have reached chamber 15, they quickly settle to the bottom of chamber 15, and are removed through discharge opening 21. The mercury droplets or denser sludge particles 30M can be separated from the water stream exiting discharge opening 21, and the water returned to the system through inlet 20.

Sludge particles 30 which are not sufficiently dense to settle through tube 11 are eventually discharged from discharge opening 22. The particles may be separated from the water, and the water recycled to the system through inlet 20.

Stirrer 35 is optional particularly if funnel opening 16 is designed so as to promote mixing of sludge particles 30 in the water from tube 11. This mixing minimizes the chances of mercury-contaminated sludge prematurely exiting separator 10 through discharge opening 22.

In one embodiment of the present invention, a process as claimed in the present invention, and as described hereinabove, was utilized to remove mercury from a sludge sample which was analyzed to contain 55% mercury and 45% of carbon particles.

The sludge was passed through a hydraulic mineral separator as shown in FIG. 1. After one pass through the mineral separator, the "overflow" from the separator was analyzed to contain 16% mercury, and the sample collected from the bottom of the separator was essentially pure mercury.

The material collected from the separator "overflow" was again passed through the separator. Additional pure mercury was collected from the sample.

Having described specific embodiments of the present invention, it will be understood that modifications thereof may be suggested to those skilled in the art, and it is intended to cover all such modifications as fall within the scope of the appended claims.

The embodiments of the invention in which an exclusive property or privilege is claimed are defined as follows:

1. A caustic sludge treatment process for continuous removal of mercury from a caustic sludge, which process comprises i) separating said sludge in at least one hydraulic mineral separator apparatus to form a higher density, mercury-containing fraction and a lower density, substantially mercury-free fraction, and ii) separating said higher density fraction from said lower density fraction, wherein said hydraulic mineral separator apparatus is an essentially vertical tube with a liquid inlet at or near the bottom of said tube, a liquid outlet at or near the top of said tube, so that liquid flows upward through said tube at a selected liquid flow rate from said liquid inlet to said liquid outlet, a sludge inlet at or near the top of said tube, and a higher density fraction outlet at or near the bottom of said tube, and wherein said liquid flows at a rate upward through said tube so that only the higher density portion of a caustic sludge material added into said tube will fall to the bottom of the tube and exits said tube through said higher density outlet and the lower density portion of said material exits said tube through said liquid outlet.

2. A process as claimed in claim 1 wherein said higher density, mercury-containing fraction is comprised of droplets of liquid mercury.

3. A process as claimed in claim 2 wherein said higher density, mercury-containing fraction consists of greater than 90% mercury, by weight.

4. A process as claimed in claim 3 wherein said higher density, mercury-containing fraction consists of greater than 95% mercury, by weight.

5. A process as claimed in claim 1 wherein said higher density, mercury-containing fraction is treated in a second hydraulic mineral separator apparatus to form a second higher density, mercury-containing fraction and a second lower density, substantially mercury-free fraction, followed by separation of said second higher density fraction from said lower density fraction.

6. A process as claimed in claim 5 wherein said second higher density fraction consists of greater than 95% mercury, by weight.

7. A process as claimed in claim 1 wherein said hydraulic mineral separator apparatus is operated using water.

8. A process as claimed in claim 7 wherein said caustic sludge treatment process is followed by a water treatment process to remove mercury from the water used in said hydraulic mineral separator apparatus.

9. A process as claimed in claim 1 wherein said caustic sludge comprises less than 70% by weight of mercury.

10. A process as claimed in claim 1 wherein said caustic sludge comprises 30% to 55% mercury, by weight.

* * * * *